United States Patent
Yoshioka et al.

(10) Patent No.: US 10,410,083 B2
(45) Date of Patent: *Sep. 10, 2019

(54) BIOLOGICAL IMAGE PRESENTATION DEVICE, BIOLOGICAL IMAGE PRESENTATION METHOD, PROGRAM, AND BIOLOGICAL IMAGE PRESENTATION SYSTEM

(71) Applicant: Sony Corporation, Tokyo (JP)

(72) Inventors: Shigeatsu Yoshioka, Kanagawa (JP); Gakuho Fukushi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/132,536

(22) Filed: Apr. 19, 2016

(65) Prior Publication Data

US 2016/0232422 A1 Aug. 11, 2016

Related U.S. Application Data

(63) Continuation of application No. 12/731,942, filed on Mar. 25, 2010, now Pat. No. 9,323,037.

(30) Foreign Application Priority Data

Apr. 1, 2009 (JP) ................................. 2009-089413

(51) Int. Cl.
*H04N 7/18* (2006.01)
*G06K 9/46* (2006.01)
(Continued)

(52) U.S. Cl.
CPC ........... *G06K 9/4671* (2013.01); *G02B 21/16* (2013.01); *G02B 21/34* (2013.01); *G02B 21/367* (2013.01);
(Continued)

(58) Field of Classification Search
CPC .... G06K 9/4671; G06K 9/6202; G06T 7/003; G06T 7/004; G06T 2207/30024;
(Continued)

(56) References Cited

U.S. PATENT DOCUMENTS 6,101,265 A * 8/2000 Bacus ................ G01N 15/1475
345/665
6,259,473 B1 * 7/2001 Iko ......................... G01N 23/04
348/80
(Continued)

FOREIGN PATENT DOCUMENTS

| JP | 09-223339 | 8/1997 |
|---|---|---|
| JP | 2006-519443 | 8/2006 |
| JP | 2006-292999 | 10/2006 |

*Primary Examiner* — Jayanti K Patel
*Assistant Examiner* — Richard B Carter
(74) *Attorney, Agent, or Firm* — K&L Gates LLP

(57) ABSTRACT

A biological image presentation device includes: an acquisition unit; a determination unit determining an image as a standard and an image for comparison; an extraction unit extracting, from the image as a standard, a position where a change of luminance value equal to or larger than a defined value is present; a detection unit detecting a position corresponding to the position extracted from the image for comparison; a division unit dividing the image as a standard on the basis of the position extracted; a mapping unit mapping the image for comparison to an area corresponding to each divided area of the image as a standard while modifying so as to conform to the shape of the divided area; and a display control unit switching and displaying an image for display in a display area by using the image as a standard and an image mapped by the mapping unit.

20 Claims, 8 Drawing Sheets

CONFIGURATION OF BIOLOGICAL IMAGE PRESENTATION SYSTEM

(51) Int. Cl.
    *G02B 21/16* (2006.01)
    *G02B 21/34* (2006.01)
    *G02B 21/36* (2006.01)
    *G06K 9/00* (2006.01)
    *G06K 9/62* (2006.01)
    *G06T 7/33* (2017.01)
    *G06T 7/70* (2017.01)

(52) U.S. Cl.
    CPC ......... G02B 21/368 (2013.01); G06K 9/0014 (2013.01); G06K 9/469 (2013.01); G06K 9/6202 (2013.01); G06T 7/337 (2017.01); G06T 7/70 (2017.01); *G06T 2207/10056* (2013.01); *G06T 2207/20021* (2013.01); *G06T 2207/30024* (2013.01)

(58) Field of Classification Search
    CPC ........... G06T 2207/10056; G06T 2207/20021; G02B 21/367; G02B 21/368

USPC ...................... 348/79, 80; 600/407; 345/665; 435/288.7; 378/162, 37; 382/107; 359/368

See application file for complete search history.

(56) References Cited

U.S. PATENT DOCUMENTS

| | | | |
|---|---|---|---|
| 6,904,163 B1* | 6/2005 | Fujimura | G06T 7/0012 378/162 |
| 9,323,037 B2* | 4/2016 | Yoshioka | G02B 21/16 |
| 2003/0007598 A1* | 1/2003 | Wang | A61B 6/463 378/37 |
| 2006/0034490 A1* | 2/2006 | Mihara | G06K 9/00335 382/107 |
| 2006/0058624 A1* | 3/2006 | Kimura | A61B 5/055 600/407 |
| 2008/0269598 A1 | 10/2008 | Buelow et al. | |
| 2009/0005672 A1 | 1/2009 | Sugiura | |
| 2009/0081769 A1* | 3/2009 | Kiyota | C12Q 1/02 435/288.7 |
| 2009/0202124 A1 | 8/2009 | Matsuda et al. | |
| 2011/0181622 A1 | 7/2011 | Bacus et al. | |

* cited by examiner

CONFIGURATION OF BIOLOGICAL IMAGE PRESENTATION SYSTEM

GROUP OF SLIDE GLASSES TO WHICH RESPECTIVE
TISSUE SLICES IN DEPTH DIRECTION ARE FIXED

FUNCTIONAL CONFIGURATION OF CPU EXECUTING ACQUISITION PROCESSING

ACQUISITION OF IMAGE FOR EACH AREA OF TISSUE SLICE

EXTRACTION RESULT OF FEATURE POINT

SEARCH OF CORRESPONDING POINT

TRIANGULATION

MAPPING OF TRIANGULAR PATCH

BIOLOGICAL IMAGE PRESENTATION DEVICE, BIOLOGICAL IMAGE PRESENTATION METHOD, PROGRAM, AND BIOLOGICAL IMAGE PRESENTATION SYSTEM

CROSS REFERENCES TO RELATED APPLICATIONS

The present application is a continuation application of U.S. patent application Ser. No. 12/731,942 filed on Mar. 25, 2010, which application claims priority to Japanese Priority Patent Application JP 2009-089413 filed in the Japan Patent Office on Apr. 1, 2009, the entire contents of which is hereby incorporated by reference.

BACKGROUND

The present application relates to a biological image presentation device, a biological image presentation method, a program, and a biological image presentation system. The present application is suitable for application to the field of image processing.

A pathological sample is created by fixing a tissue slice sectioned from an excised tissue onto a glass slide and staining the tissue slice as occasion demands, and stored. In general, if the pathological sample is stored for a long period of time, visibility on a microscope is deteriorated due to deterioration or discoloring of the tissue slice. The pathological sample is used for diagnosis at institutions other than the institution, such as a hospital, which has created the pathological sample, and the pathological sample is generally delivered by mail. Accordingly, it takes a predetermined time to deliver the pathological sample.

Taking such a situation into consideration, a computer system is suggested in which an enlarged image of a tissue slice in a pathological sample is stored as image data, and the enlarged image is presented on a display screen (for example, see JP-T-2006-292999).

SUMMARY

A pathological sample is created for tissue slices at multiple positions from the surface layer to the deep layer of the excised tissue, but a complex operation should be made to find a specific cell of a tissue slice of any layer from a tissue slice of a layer different from the relevant layer by using the display screen. For this reason, there is a specific demand for tissue slice images of respective tomographic layers from the surface layer to the deep layer to be three-dimensionally viewed.

However, when the tissue slice images of the respective tomographic layers from the surface layer to the deep layer are three-dimensionally viewed, the tissue slices of the respective tomographic layers are not subjected to processes, such as sectioning, staining, fixation, and the like, so the tissue slices are not identical.

For this reason, when a tissue slice image of a different tomographic layer is displayed from a tissue slice image of any tomographic layer, the relevant tissue slice image may be viewed as an entirely different image even though both images are identical.

Thus, it is desirable to provide a biological image presentation device, a biological image presentation method, a program, and a biological image presentation system capable of improving visibility.

An embodiment provides a biological image presentation device. The device includes an acquisition unit acquiring, at multiple positions on an axis as a standard of a biological region, images of sections orthogonal to the axis, a determination unit determining an image as a standard and an image for comparison with the image as a standard from among a plurality of images acquired by the acquisition unit, an extraction unit extracting, from the image as a standard, a position where a change of luminance value equal to or larger than a defined value is present, a detection unit detecting a position corresponding to the position extracted by the extraction unit from the image for comparison, a division unit dividing the image as a standard on the basis of the position extracted by the extraction unit, a mapping unit mapping the image for comparison to an area corresponding to each divided area of the image as a standard while modifying so as to conform to the shape of the divided area, and a display control unit switching and displaying an image for display in a display area by using the image as a standard and an image mapped by the mapping unit.

Another embodiment provides a biological image presentation method. The method includes the steps of acquiring, at multiple positions on an axis as a standard of a biological region, images of sections orthogonal to the axis, determining an image as a standard and an image for comparison with the image as a standard from among a plurality of images acquired in the step of acquiring the images, extracting, from the image as a standard, a position where a change of luminance value equal to or larger than a defined value is present, detecting a position corresponding to the position extracted in the step of extracting the position from the image for comparison, dividing the image as a standard on the basis of the position extracted in the step of extracting the position, mapping the image for comparison to an area corresponding to each divided area of the image as a standard while modifying so as to conform to the shape of the divided area, and switching and displaying an image for display in a display area by using the image as a standard and an image mapped in the step of mapping the image for comparison.

Still another embodiment provides a program. The program causes a computer to execute the steps of acquiring, at multiple positions on an axis as a standard of a biological region, images of sections orthogonal to the axis, determining an image as a standard and an image for comparison with the image as a standard from among a plurality of acquired images, extracting, from the image as a standard, a position where a change of luminance value equal to or larger than a defined value is present, detecting a position corresponding to the extracted position from the image for comparison, dividing the image as a standard on the basis of the extracted position, mapping the image for comparison to an area corresponding to each divided area of the image as a standard while modifying so as to conform to the shape of the divided area, and switching and displaying an image for display in a display area by using the image as a standard and a mapped image.

Yet another embodiment provides a biological image presentation system. The system includes a microscope and a data processor. The data processor includes an acquisition unit acquiring, from the microscope, enlarged images of tissue slices sliced at multiple positions in a depth direction of a tissue excised from a biological region, a determination unit determining an image as a standard and an image for comparison with the image as a standard from among a plurality of images acquired by the acquisition unit, an extraction unit extracting, from the image as a standard, a position where a change of luminance value equal to or larger than a defined value is present, a detection unit detecting a position corresponding to the position extracted by the extraction unit from the image for comparison, a division unit dividing the image as a standard on the basis of the position extracted by the extraction unit, a mapping unit mapping the image for comparison to an area corresponding to each divided area of the image as a standard while modifying so as to conform to the shape of the divided area, and a display control unit switching and displaying an image for display in a display area by using the image as a standard and an image mapped by the mapping unit.

According to an embodiments, the comparison image is mapped to each area based on a feature point while conforming to the area shape of the standard image. For this reason, even though the images (tomographic images) of the respective sections of a biological body correspond to each other but are different in shape, the difference can be corrected while the shape of the internal organ itself can be maintained. Therefore, when an image for display in the display area is switched, it is possible to avoid the images before and after switching from being viewed as entirely different images even though the images are identical. As a result, a biological image presentation device, a biological image presentation method, a program, and a biological image presentation system capable of improving visibility can be realized.

Additional features and advantages are described herein, and will be apparent from the following Detailed Description and the figures.

DETAILED DESCRIPTION

Embodiments of the present application will be described below in detail with reference to the drawings. The description will be provided in the following sequence.

<1. Embodiment>
[1-1. Configuration of biological Image Presentation Device]
[1-2. Configuration of Data Processor]
[1-3. Acquisition Processing of Tissue Slice Image]
[1-4. Image Processing of Tissue Slice Image]
[1-5. Presentation Processing of Tissue Slice Image]
[1-6. Effects and the like]

<2. Other Embodiments>

1. Embodiment

[1-1. Configuration of Biological Image Presentation Device]

Figure 1:
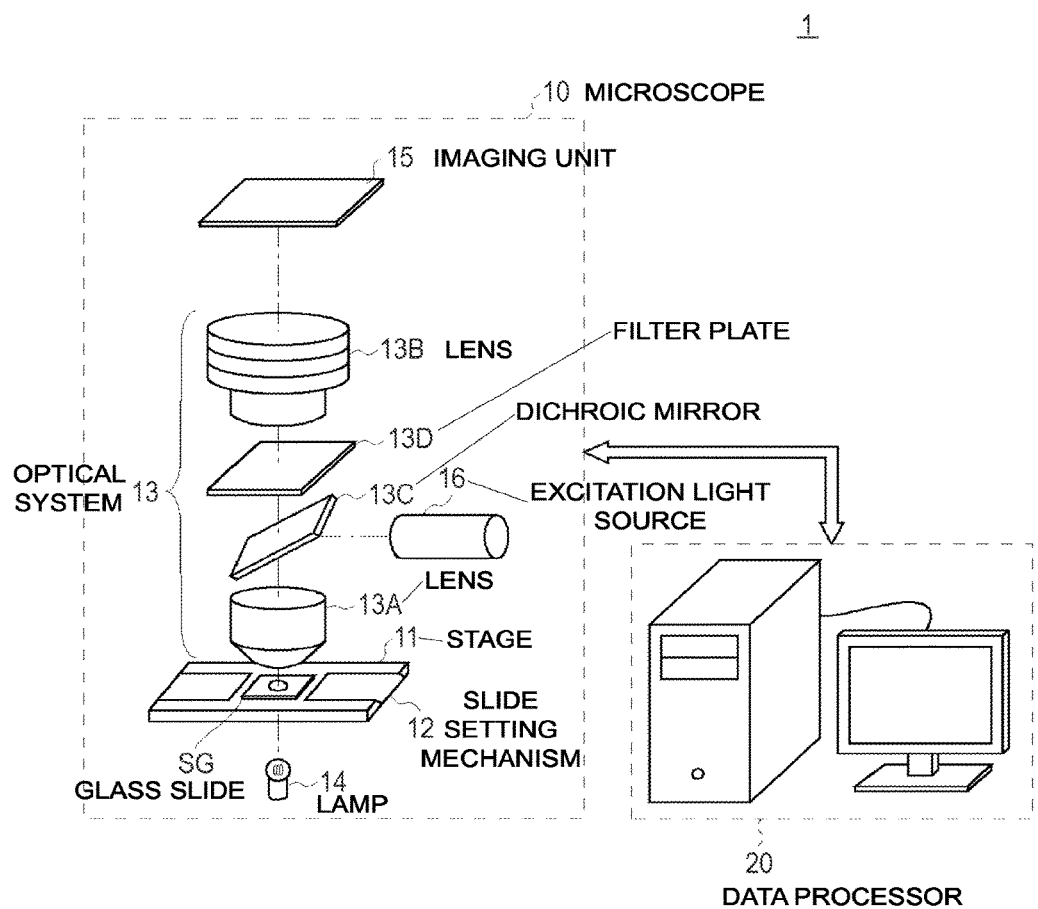
FIG. 1 is a diagram schematically showing the configuration of a biological image presentation device.

FIG. 1 shows a biological image presentation system 1. The biological image presentation system 1 includes a microscope 10 and a data processor 20.

The microscope 10 has a surface (hereinafter, also referred to as a slide setting surface) on which a glass slide SG is set, and includes a stage (hereinafter, also referred to as a movable stage) 11 which can be moved parallel and orthogonally (xyz-axis direction) with respect to the slide setting surface.

The movable stage 11 is provided with a mechanism (hereinafter, also referred to as a slide setting mechanism) 12 which sets a plurality of glass slides SG contained in a glass slide container (not shown) at a set position on the slide setting surface one by one.

Figure 2:
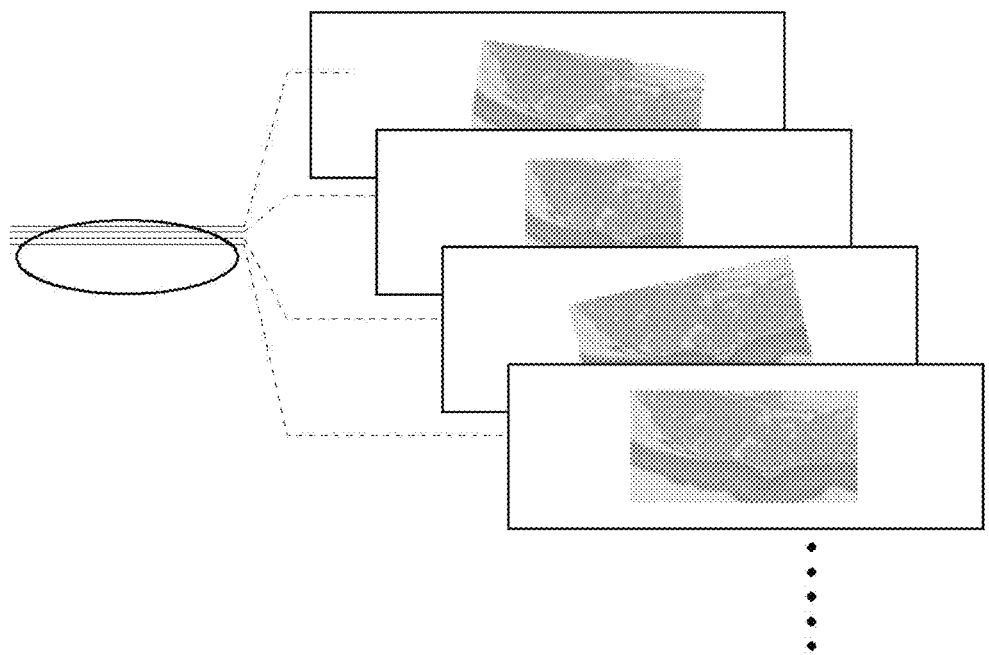
FIG. 2 is a schematic view illustrating a group of glass slides onto which respective tissue slices in a depth direction are fixed.

In this embodiment, a tissue slice is fixed onto the glass slide SG by a predetermined fixing method. As shown in FIG. 2, all or a part of tissue slices sectioned from a excised tissue of a biological body in a depth (deep portion) direction are fixed onto the respective glass slides, and the glass slides are contained in the glass slide container in order, for example, from a glass slide onto which a surface layer-side (shallow sectioning position) tissue slice is fixed.

The tissue slice is stained as occasion demands. Staining includes general staining represented by HE (hematoxylin-eosin) staining, Giemsa staining, or Papanicolaou staining, as well as fluorescent staining, such as FISH (Fluorescence In-Situ Hybridization) or enzyme antibody technique.

An optical system 13 is arranged on one surface of the movable stage 11, and an illumination lamp 14 is arranged on the other surface of the movable stage 11. Light of the illumination lamp 14 is reached from an opening formed at the set position on the slide setting surface as illumination light with respect to a biological sample SPL arranged on one surface of the movable stage 11.

The microscope 10 enlarges an image of a part of a tissue slice obtained by illumination light at a predetermined magnification by a first objective lens 13A and a second objective lens 13B of the optical system 13, and forms the image on an imaging surface of the imaging unit 15.

The microscope 10 also has an excitation light source 16 which irradiates excitation light with respect to fluorescent stain. When excitation light is irradiated from the excitation light source 16, the microscope 10 causes excitation light to be reflected by a dichroic mirror 12C provided between the first objective lens 13A and the second objective lens 13B and to be directed to the first objective lens 13A. The microscope 10 focuses excitation light on the glass slide SG arranged on the movable stage 11 by the first objective lens 13A.

When the biological sample SPL fixed onto the glass slide SG is subjected to fluorescent stain, a fluorescent pigment emits light due to excitation light. Light (hereinafter, also referred to as coloring light) resulting from the light-emission transmits the dichroic mirror 12C through the first objective lens 13A. Coloring light reaches the second objective lens 13B through an absorbent filter plate 13D provided between the dichroic mirror 12C and the second objective lens 13B.

The microscope 10 enlarges the image of coloring light by the first objective lens 13A, and absorbs light (hereinafter, also referred to as outside light) other than coloring light by the absorbent filter plate 13D. Then, the microscope 10 enlarges the image of coloring light with no outside light by the second objective lens 13B, and forms the image on the imaging surface of the imaging unit 15.

The data processor 20 is configured to store the enlarged images (hereinafter, also referred to as enlarged slice images) of tissue slices (FIG. 2) of an excised tissue at multiple positions in the depth (deep portion) direction as a predetermined format of data.

Therefore, the biological image presentation system 1 can store the tissue slice for a long period of time without deteriorating the states of fixing or staining, as compared with the glass slide SG itself is stored.

The data processor 20 is configured to construct a three-dimensionally combined image (hereinafter, also referred to as a three-dimensional tissue image) of the enlarged slice images, and to present the three-dimensional tissue image or the enlarged slice images.

Therefore, the biological image presentation system 1 can present the state of the excised tissue at various points of time, and as a result, the invasion depth (the degree of invasiveness) of a pathological change and the like can be accurately determined.

[1-2. Configuration of Data Processor]

Figure 3:
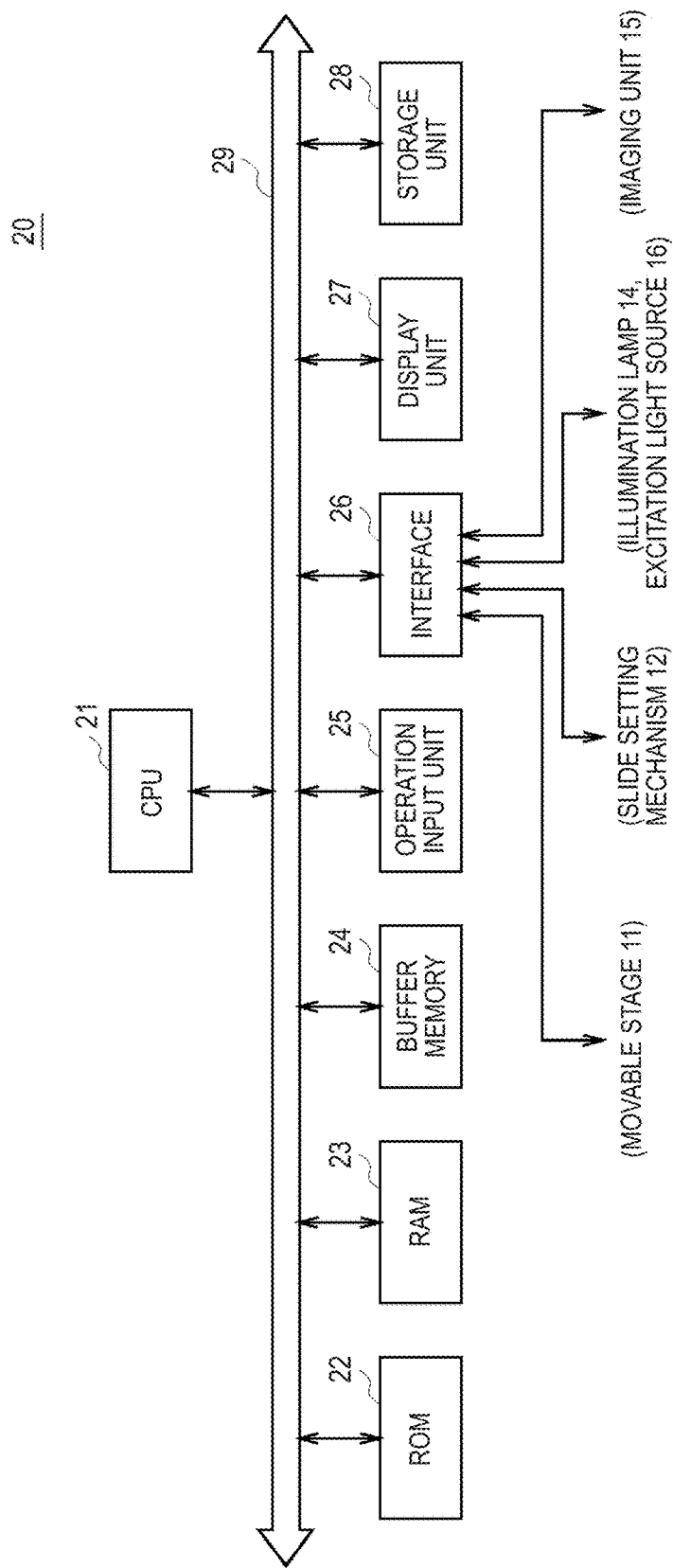
FIG. 3 is a block diagram showing the configuration of a data processor.

FIG. 3 shows the configuration of the data processor 20. The data processor 20 has a configuration in which various kinds of hardware are connected to a CPU (Central Processing Unit) 21, which performs overall control of the biological image presentation system 1.

Specifically, a ROM (Read Only Memory) 22, a RAM (Random Access Memory) 23 as a work memory of the CPU 21, a buffer memory 24, an operation input unit 25 for inputting a command according to a user's operation, an interface 26, a display unit 27, and a storage unit 28 are connected to the CPU 21 through a bus 29.

The ROM 22 stores programs for executing various kinds of processing. The movable stage 11, the slide setting mechanism 12, the illumination lamp 14, the imaging unit 15, and the excitation light source 16 are connected to the interface 26 through a predetermined communication path.

For the display unit 27, a liquid crystal display, an EL (Electro Luminescence) display, or a plasma display is used. For the storage unit 28, a magnetic disk represented by an HD (Hard Disk), a semiconductor memory, or an optical disk is used. A portable memory, such as a USB (Universal Serial Bus) memory or a CF (Compact Flash) memory, may be used.

The CPU 21 loads a program corresponding to a command from the operation input unit 25 from among a plurality of programs stored in the ROM 22 on the RAM 23, and appropriately controls the buffer memory 24, the display unit 27, and the storage unit 28 in accordance with the loaded program.

The CPU 21 is also configured to appropriately control the movable stage 11, the slide setting mechanism 12, the illumination lamp 14, the imaging unit 15, and the excitation light source 16 through the interface 26 in accordance with the loaded program.

[1-3. Acquisition Processing of Tissue Slice Image]

Figure 4:
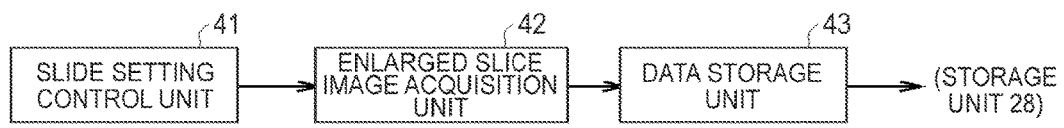
FIG. 4 is a block diagram showing the functional configuration of a CPU which executes acquisition processing.

When an acquisition command of an enlarged slice image is received from the operation input unit 25, the CPU 21 functions as a slide setting mechanism 41, an enlarged slice image acquisition unit 42, and a data storage unit 43 in accordance with a program corresponding to the acquisition command, as shown in FIG. 4.

The slide setting mechanism 41 controls the slide setting mechanism 12 to set a plurality of glass slides SG contained in the glass slide container one by one at the set position on the slide setting surface.

Each time a glass slide SG is set by the slide setting mechanism 41, the enlarged slice image acquisition unit 42 acquires an enlarged slice image of a tissue slice fixed onto the set glass slide SG.

Specifically, as a first step, the enlarged slice image acquisition unit 42 adjusts the focus position of the optical system 13 and also the sensitivity of the imaging unit 15.

With regard to adjustment of the focus position, for example, a method is used in which the movable stage 11 is controlled on the basis of a pixel value represented by captured data output from the imaging unit 15, such that the relative positions of the optical system 13 and the imaging surface of the imaging unit 15 in the optical axis direction are varied.

With regard to adjustment of the sensitivity of the imaging unit 15, for example, a method is used in which all or part of the irradiation amount (light intensity) of excitation light of the illumination lamp 14 or the excitation light source 16, the exposure time in the imaging unit 15, and the aperture ratio of the aperture stop are varied.

Figure 5:
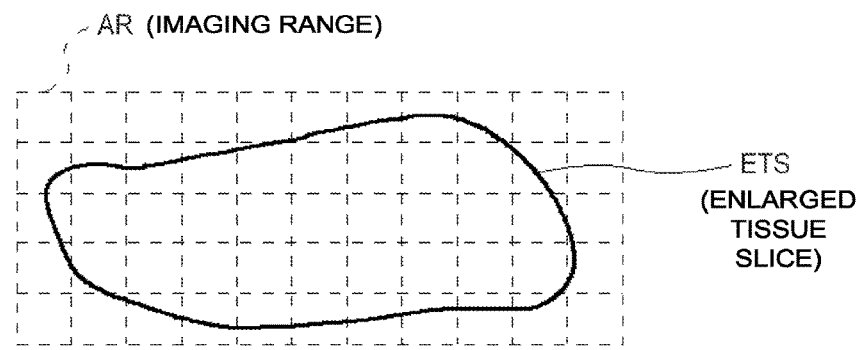
FIG. 5 is a schematic view illustrating acquisition of an image of each area of a tissue slice.

As a second step, for example, as shown in FIG. 5, the enlarged slice image acquisition unit 42 moves the movable stage 11 along the slide setting surface such that a tissue slice ETS (enlarged slice image) enlarged through the objected lenses 13A and 13B is assigned to an imaging range AR. In FIG. 5, the area of the tissue slice ETS which is assigned to the imaging range AR does not overlap other areas, but a part of an adjacent area may overlap the area of the tissue slice ETS.

As a third step, the enlarged slice image acquisition unit 42 connects the area by using captured data of the area assigned to the imaging range AR so as to generate an enlarged slice image.

As a fourth step, the enlarged slice image acquisition unit 42 generates an enlarged slice image as an image of different resolution for each level, and divides each level of enlarged slice image in terms of a predetermined block (hereinafter, also referred to as a tile).

In this way, the enlarged slice image acquisition unit 42 is configured to generate the enlarged slice image of the tissue slice fixed onto the glass slide SG to correspond each level of resolution which should be displayed in the display area.

When the enlarged slice image corresponding to each level of resolution is generated, the data storage unit 43 generates a reduced image (hereinafter, also referred to as a thumbnail slice image) of the enlarged slice image corresponding to the defined level of resolution and identification information regarding the enlarged slice image.

The data storage unit 43 is configured to record the enlarged slice image corresponding to each level of resolution and the thumbnail slice image in the storage unit 28 as a predetermined format of data associated with identification information.

The identification information is information which includes, for example, the slide number, the name, assigned number, sex, and age of a person (patient) whose tissue slice is collected, the collection date, and the like. The slide number is given, for example, in order from a glass slide, onto which a tissue slice (a tissue slice which is sectioned earlier) as a shallow sectioned surface of an excised tissue is fixed, in terms of tissue slice-collected persons.

As a method of acquiring identification information, for example, a method is used in which identification information is acquired from a barcode attached to a glass slide SG set at the set position, or identification information is input from the operation input unit 25 at a predetermined timing. The method of acquiring identification information is not limited to the illustration.

In this way, when the acquisition command of the enlarged slice image is given, the CPU 21 is configured to store the enlarged images of a tissue slice (FIG. 2) on a plurality of slice surfaces in the depth (deep portion) direction as data.

[1-4. Image Processing of Tissue Slice Image]

Figure 6:
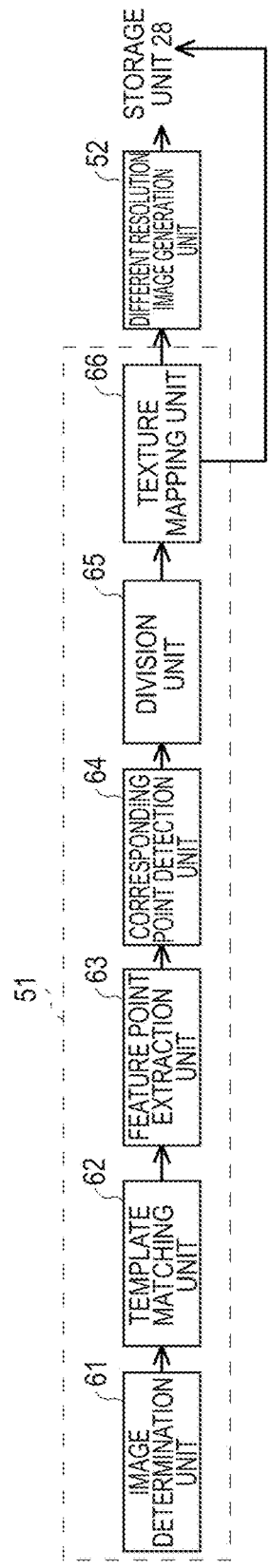
FIG. 6 is a block diagram showing the functional configuration of the CPU which executes image processing.

When the above-described acquisition processing ends, the CPU 21 functions as a three-dimensional image generation unit 51 and a different resolution image generation unit 52 in accordance with a program regarding image processing, as shown in FIG. 6.

The three-dimensional image generation unit 51 generates a three-dimensional image from the enlarged slice image on the respective slice surfaces for each tissue slice-collected person, and is functionally divided into an image determination unit 61, a template matching unit 62, a feature point extraction unit 63, a corresponding point detection unit 64, a division unit 65, and a texture mapping unit 66.

The image determination unit 61 determines an enlarged slice image as a criterion (hereinafter, also referred to as a criterion tomographic image) and an enlarged slice image for comparison with the criterion tomographic image (hereinafter, also referred to as a reference tomographic image) from a plurality of enlarged slice images.

In an embodiment, the respective enlarged slice images are determined as a criterion tomographic image in order from an enlarged slice image whose sectioning position is shallow, and an enlarged slice image which is located on the surface layer side or deep layer side with respect to the sectioning position of the criterion tomographic image is determined as a reference tomographic image.

The template matching unit 62 positions the reference tomographic layer with respect to the criterion tomographic layer. For the positioning method, for example, a method is used in which the reference tomographic image is moved parallel or rotated such that the correlation with the pixel level at the criterion tomographic image is minimized.

The feature point extraction unit 63 extracts a position where a change of luminance value stands out (a position where a change of luminance value equal to or smaller than a defined value is present) as a feature point from the criterion tomographic image by using an extraction algorithm called Harris corner.

Figure 7:
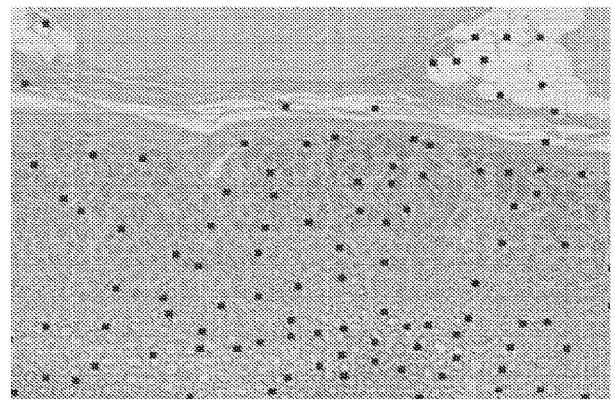
FIG. 7 is a photograph showing an extraction result of a feature point.

FIG. 7 shows a photograph in which feature points extracted from an enlarged slice image are attached in the form of black points. As will be apparent from FIG. 7, the extraction algorithm is advantageous in that no feature point is extracted from a portion where gradation is present. The extraction algorithm is also advantageous in that it is robust with respect to rotation of an image to be extracted.

The corresponding point detection unit 64 detects a point (hereinafter, referred to as a corresponding point) in the criterion tomographic image corresponding to the feature point from the reference tomographic image.

Specifically, as a first step, the corresponding point detection unit 64 sequentially determines each feature point in the criterion tomographic image as a point that is an attention target (hereinafter, referred to as an attention point).

Figure 8:
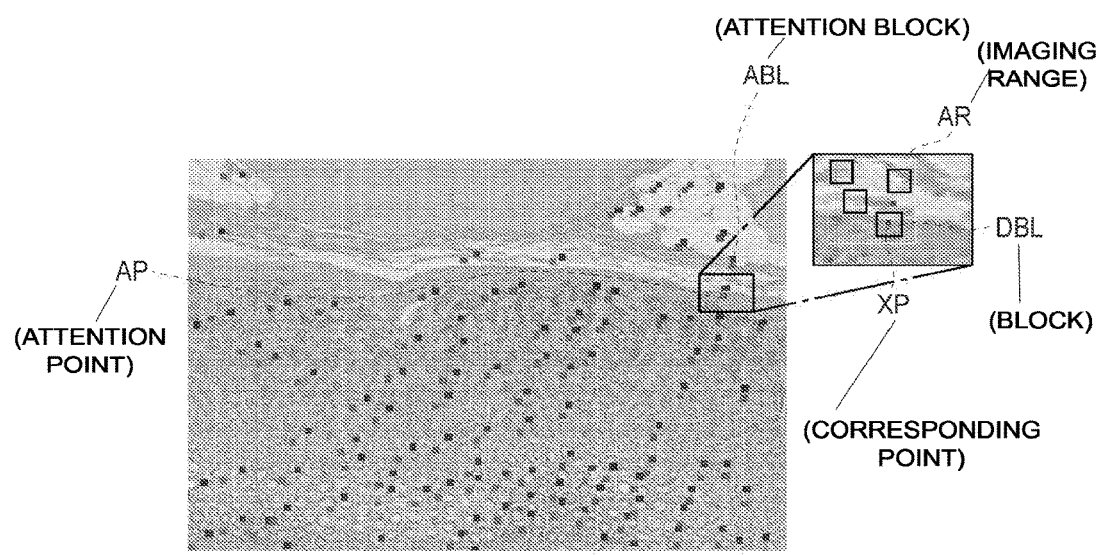
FIG. 8 is a photograph illustrating search of a corresponding point.

As a second step, as shown in FIG. 8, the corresponding point detection unit 64 recognizes a block of a predetermined size (hereinafter, referred to as an attention block) ABL around the determined attention point AP.

The corresponding point detection unit 64 searches a block having highest similarity to the attention block ABL from a search range AR of a size larger than the attention block ABL on the basis of a position of the reference tomographic image corresponding to the attention point AP, for example, by a normalized correlation method.

As a third step, when the highest similarity (correlation value) of a block DBL with respect to the attention block ABL is equal to or larger than a set value, the corresponding point detection unit 64 detects the center of the relevant block DBL as a corresponding point XP of the attention point AP.

Meanwhile, when the highest similarity (correlation value) of the attention block ABL and the block DBL is smaller than the set value, the corresponding point detection unit 64 is configured to determine that there is no corresponding point XP of the attention point AP and to delete the attention point AP.

Therefore, even when a portion which does not have a feature as a tissue form is extracted as a feature point by the feature point extraction unit 63 since the tissue slice is damaged, expanded/reduced, or air bubbles are generated during sectioning, staining, and fixation, the relevant portion is deleted by the corresponding point detection unit 64.

As described above, the three-dimensional image generation unit 51 is configured to accurately extract, as a feature point, a portion which truly has a feature as a tissue form.

When the corresponding point in the reference tomographic image is detected, the division unit 65 divides the criterion tomographic image into triangular areas with a feature point as an apex (hereinafter, also referred to as triangular patches) by using a division algorithm called Delaunay triangulation.

Figure 9:
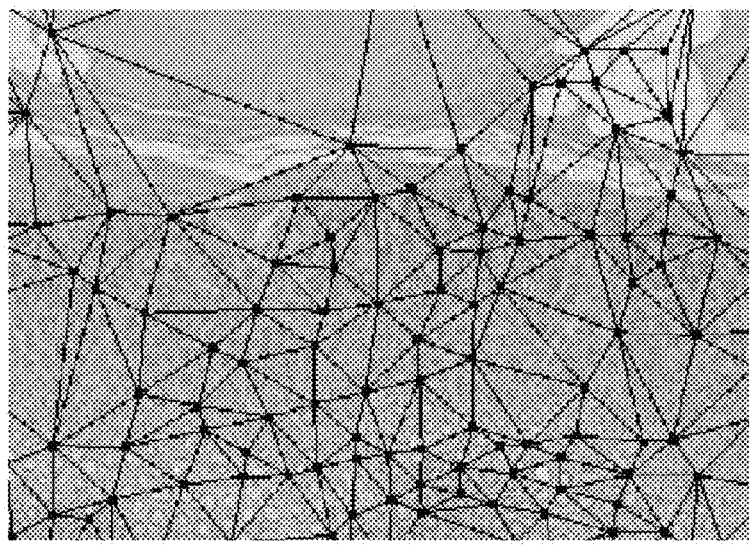
FIG. 9 is a photograph illustrating triangulation.

FIG. 9 shows a photograph in which division boundaries dividing the criterion tomographic image are attached as black lines. As will be apparent from FIG. 9, as the number of feature points, a complex tissue form is present, and the relevant form is divided finer.

The texture mapping unit 66 recognizes an area corresponding to each triangular patch of the criterion tomographic image on the basis of the corresponding point in the reference tomographic image. If the tissue slice is damaged, expanded/reduced, or air bubbles are generated, each area does not conform to the shape of the corresponding triangular patch since the absolute positions of the corresponding point and the feature point of the criterion tomographic image differ.

Figure 10:
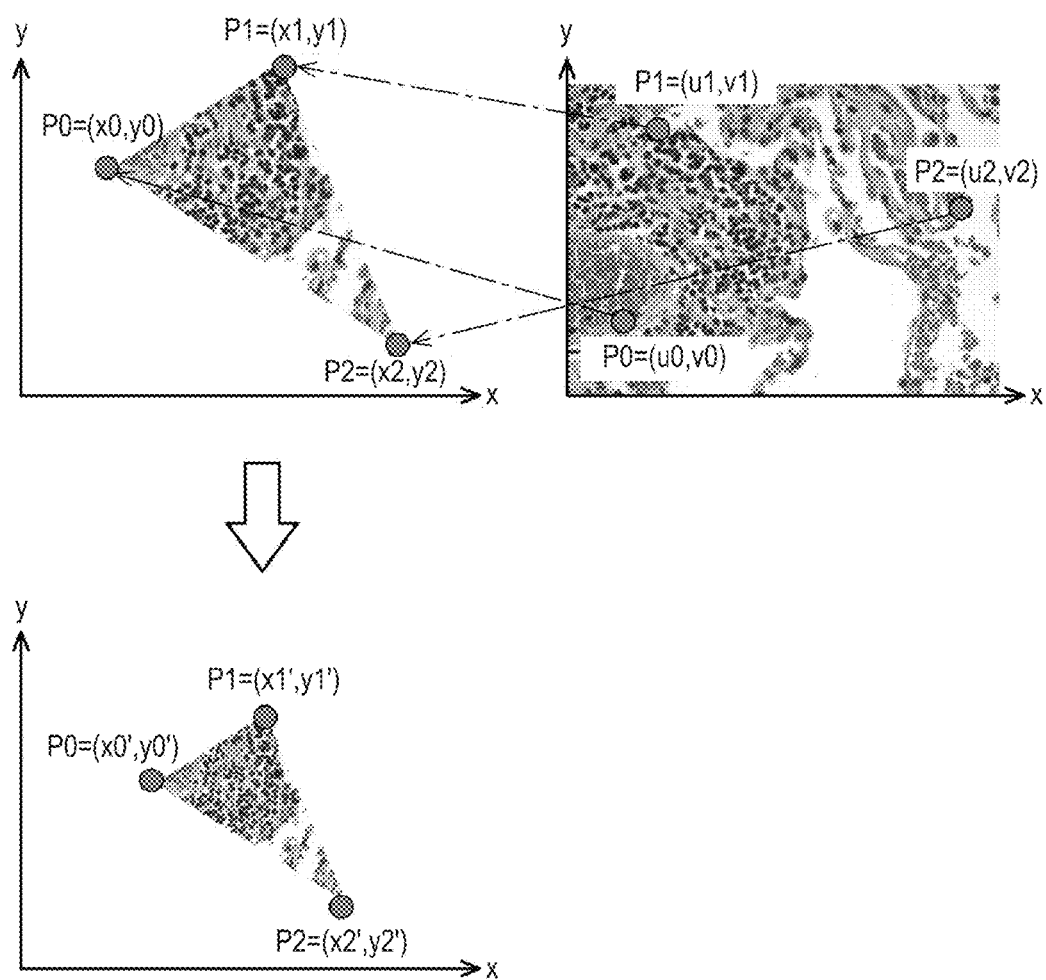
FIG. 10 is a photograph illustrating mapping of a triangular patch.

As shown in FIG. 10, the texture mapping unit 66 maps each pixel of the reference tomographic image to a corresponding position of a three-dimensional object while modifying each the area so as to conform to the shape of the corresponding triangular patch.

Therefore, even though the areas in the respective tomographic images correspond to each other but are different in shape, the difference is corrected while the shape of the internal organ itself is maintained. In addition, the gap between the sectioning positions of the excised tissue in the deep layer direction differ depending on trial cuts or skills, and the difference is reflected in the shapes of the areas of the respective tomographic images even though they correspond to each other, but this difference is also corrected while the shape of the internal organ itself is maintained.

As a complex tissue form is present, the correction unit (triangular patch) becomes finer, so the shape of the internal organ between the tomographic layers is accurately maintained regardless of complexity of the tissue form.

In this way, the three-dimensional image generation unit 51 is configured to map the enlarge slice images on the respective slice surfaces for each tissue slice-collected person, and to store the mapped enlarged slice images (hereinafter, also referred to as a three-dimensional slice image) in the storage unit 28 as a predetermined format of data associated with identification information.

For comparison, the mapped enlarged slice images include an enlarged slice image (criterion tomographic image) whose sectioning position is shallowest.

When the three-dimensional slice image is generated from the enlarged slice images, the different resolution image generation unit 52 generates the three-dimensional slice image as an image of different resolution for each level, and divides each level of three-dimensional slice image in terms of tiles.

The different resolution image generation unit 52 is configured to store the three-dimensional image corresponding to each level of resolution in the storage unit 28 as a predetermined format of data associated with identification information.

[1-5. Presentation Processing of Tissue Slice Image]

When a presentation command of a tissue image is given from the operation input unit 25, the CPU 21 displays a screen (hereinafter, also referred to as a thumbnail image), which shows the thumbnail slice images to be stored in terms of tissue slice-collected persons, on the display unit 27 in accordance with a program corresponding to the presentation command.

When a thumbnail slice image which should be displayed as an enlarged slice image is selected, the CPU 21 displays the thumbnail slice image and a pointer capable of moving the thumbnail slice image in accordance with the operation of the operation input unit 25.

In this case, the CPU 21 selects an enlarged slice image corresponding to an initial resolution from among the enlarged slice images corresponding to the respective levels of resolution associated with the thumbnail slice image for selection. The CPU 21 reads a tile in a portion (hereinafter, also referred to as an image for display) corresponding to the display area from the selected enlarged slice image and displays the tile.

When a position for display is designated from the operation input unit 25 (when the position of the pointer is changed), the CPU 21 reads a tile in the image for display on the basis of the designated position and displays the tile.

When resolution for display is designated, the CPU 21 reads a tile in the image for display from an enlarged slice image corresponding to the designated resolution on the basis of the position of the pointer at the time of designation and displays the tile.

In this way, the CPU 21 is configured to switch the position in the surface direction or resolution of the enlarged slice image for display in the display area in accordance with designation from the operation input unit 25.

The thumbnail slice image for selection, the pointer, and the image for display are displayed as the same display layer by switching the thumbnail screen or in a layer higher than the display layer of the thumbnail screen.

Meanwhile, when a thumbnail slice image for display as a three-dimensional tissue image is selected, the CPU 21 displays a three-dimensional object and a pointer capable of moving the three-dimensional object in accordance with an operation of the operation input unit 25.

In this case, the CPU 21 selects a three-dimensional slice image corresponding to the initial resolution and an initial tomographic surface from among three-dimensional slice images corresponding to the respective levels of resolution associated with the thumbnail slice image for selection. The CPU 21 reads, from the storage unit 28, a tile in a portion (hereinafter, also referred to as an image for display) corresponding to the display area from the selected three-dimensional slice image, and displays the tile in the display area.

When a position for display is designated from the operation input unit 25 (when the position of the pointer is changed), the CPU 21 reads, from the storage unit 28, a tile in the image for display from a three-dimensional slice image corresponding to a tomographic surface at the designated position on the basis of the designated position. Then, the CPU 21 displays the tile read from the storage unit 28 in the display area.

When resolution for display is designated, the CPU 21 reads a tile in the image for display from a three-dimensional slice image corresponding to the tomographic surface at the time of designation from among the three-dimensional slice images corresponding to the designated resolution on the basis of the position of the pointer at the time of designation, and displays the tile.

As described above, the CPU 21 is configured to switch the position in the depth direction or the surface direction or resolution of a three-dimensional slice image for display in the display area in accordance with designation from the operation input unit 25.

The three-dimensional object, the pointer, and the image for display are displayed as the same display layer by switching the thumbnail screen or in a layer higher than the display layer of the thumbnail screen.

In this embodiment, when the image for display in the display area is displayed in the display area, the CPU 21 predicts the next image for display (hereinafter, also referred to as a display predicted image) in accordance with the current image for display. The CPU 21 reads a tile in the display predicted image from the storage unit 28, and stores the tile in the buffer memory 24.

Then, the CPU 21 reads a tile of the same portion as the display predicted image in the next image for display in the display area from the buffer memory 24, reads a tile of a portion different from the display predicted image from the storage unit 28, and displays the tiles in the display area.

Thus, the CPU 21 is configured to smoothly display adjacent images for display in the depth direction or the tomographic surface direction.

[1-6. Effects and the Like]

With the above-described configuration, when the enlarged slice images of the tissue slices sliced at multiple positions in the depth direction of the excised tissue are acquired, the biological image presentation system 1 maps the enlarged slice images while modifying the enlarged slice images in terms of triangular patched (see FIG. 10).

Then, the biological image presentation system 1 switches the position in the depth direction on the three-dimensional image for display in the display area in accordance with designation from the operation input unit 25.

Therefore, even when the areas in the respective tomographic images correspond to each other but the shape or the gap between the sectioning positions in the depth direction with respect to the excised tissue differs, the biological image presentation system 1 can correct the difference while maintaining the shape of the internal organ itself.

This difference is caused due to many artificial steps, such as sectioning, staining, fixation, and the like, during the pathological sample is created. Therefore, the enlarged slice image is mapped while being modified in terms of triangular patches, and it is particularly useful for the pathological sample.

In the case of a pathological sample in which a fluorescent mark is linked to a specific gene of a tissue (FISH: Fluorescence In-Situ Hybridization), even when the fluorescent mark overlaps in the deep layer direction, the biological image presentation system 1 can accurately detect an increase/decrease in the number of genes.

2. Other Embodiments

In an embodiment, the enlarged images of the tissue slices sliced at multiple positions in the depth direction of the excised tissue of the biological body are acquired. However, the tomographic images to be acquired are not limited thereto.

For example, at multiple positions on a body axis, such as a head, a chest, or an abdomen, CT (Computed Tomography) images, MRI (Magnetic Resonance Imaging) images, PET (Positron Emission Tomography) images, or ultrasonic images of sections orthogonal to the body axis may be acquired. What is important is that, at multiple positions on an axis as a criterion in a biological region, images (tomographic images) of sections orthogonal to the axis are acquired.

With regard to acquisition of the tomographic image, the enlarged slice image acquisition unit 42 is used which acquires the tomographic image from the microscope 10 in real time. However, the acquisition unit of the tomographic image is not limited thereto.

For example, an acquisition unit may be used which, at multiple positions on an axis as a criterion, acquires images (tomographic images) of sections orthogonal to the axis at different magnifications. With this acquisition unit, the state of the excised tissue can be presented at more points of view, so it is useful in that the invasion depth (the degree of invasiveness) of a pathological change and the like can be accurately determined.

In addition, an acquisition unit may be used which acquires images from a data storage medium, in which data representing the images (tomographic images) of sections orthogonal to the axis at multiple positions on an axis as a criterion is stored. This acquisition unit is particularly useful, for example, when the location where the tomographic image is acquired is away from a diagnosis location. Furthermore, an acquisition unit may be used in which the tomographic images, such as enlarged slice images, CT images, PET images, or ultrasonic images, are selectively acquired from a corresponding device (a microscope, CT device, a PET device, or an ultrasonic device) and a data storage medium.

As the data storage medium, for example, a package medium, such as a flexible disk, a CD-ROM (Compact Disk-Read Only Memory), or a DVD (Digital Versatile Disc), or a semiconductor memory or a magnetic disk in which data is temporarily or permanently stored may be used. With regard to the method of acquiring data from the data storage medium, a wired or wireless communication medium, such as a local area network or Internet, or digital satellite broadcasting, may be used.

In the above-described embodiment, the respective enlarged slice images are determined as the criterion tomographic image in order from the enlarged slice image whose sectioning position is shallow. However, the enlarged slice image of the tissue slice of the shallowest sectioned surface or the like may be fixed as the criterion tomographic image.

In this case, the remaining enlarged slice images are determined as the reference tomographic image.

The criterion tomographic image is not limited to a single layer. For example, the enlarged slice image of the tissue slice of the shallowest sectioned surface and the enlarged slice image of the tissue slice of the deepest sectioned surface may be used as the criterion tomographic image. In this case, a notification that a criterion tomographic image should be designated may be made, and an enlarged slice image selected by the operation input unit 25 may be determined as the criterion tomographic image.

When the respective enlarged slice images are determined as the criterion tomographic image in order from the enlarge slice image whose sectioning position is shallow (or deep), the reference tomographic image is an enlarged slice image which is located adjacent to the surface layer side or deep layer side with respect to the sectioning position of the criterion tomographic image. In this case, a plurality of reference tomographic images may be set. When this happens, a more proper feature point can be obtained.

The method of determining the criterion tomographic image and the reference tomographic image is not limited to the illustration, and may be modified in various forms.

In an embodiment, the processing in the three-dimensional image generation unit 51 and the different resolution image generation unit 52 is performed before the presentation command of the tissue slice image is given. However, the time at which the processing is performed is not limited to the embodiment. For example, the processing may be performed when an image for display in the display area is read from the storage unit 28. Part of the processing in the three-dimensional image generation unit 51 and the different resolution image generation unit 52 may be performed before the presentation command of the tissue slice image is given, and the remaining processing may be performed after the presentation command is given.

In an embodiment, the image for display in the display area is switched in accordance with designation (the position of the pointer) of the operation input unit 25. However, the switching method is not limited to the embodiment.

For example, a switching method may be used in which the image for display in the display area is switched in a predetermined order, such as a raster scan order, from the outermost layer or the deepest layer. With the switching method, if switching of the image for display stops when a stop command is received from the operation input unit 25, an operation with respect to a viewer can be simplified, as compared with the above-described embodiment.

In an embodiment, when a feature point is extracted from an enlarged slice image, the extraction algorithm called Harris corner is used. However, the extraction algorithm is not limited thereto. For example, an extraction algorithm, such as Moravec, vector tracer, SUSAN (Smallest Univalue Segment Assymilating Nucleus), or SIFT (Scale Invariant Feature Transformation), may be used. Of course, other extraction algorithms may be used. Any algorithm may be used insofar as a position where a change of luminance value stands out (a position where a change equal to or smaller than a defined value is present) can be extracted.

In an embodiment, when an enlarged slice image is divided, the division algorithm calls Delaunay triangulation is used. However, the division algorithm is not limited thereto. For example, a division algorithm, such as Voronoi, may be used. Of course, other division algorithms may be used. Any algorithm may be used insofar as it divides an image into a plurality of areas on the basis of a feature point.

Although in an embodiment, the single buffer memory 24 is connected to the bus 29, a plurality of buffer memories 24 may be connected. When this happens, the image for display may be smoothly shifted regardless of the amount of image data for display or the display movement speed.

In an embodiment, the three-dimensional image is stored in the storage unit 28 of the data processor 20 through the bus 29. The storage unit 28 may be provided outside the data processor 20, instead of being provided in the data processor 20. A communication medium of data with respect to the storage unit 28 is not limited to the bus 29, and for example, a wired or wireless communication medium, such as a local area network or Internet, or digital satellite broadcasting, may be used.

The present application may be used for biotechnology-based industries, such as experiments of biology, development of medicine, and follow-up of patients according to an embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A biological image processing device comprising:
   an acquisition unit configured to acquire, at multiple positions on an axis as a standard of a biological region, images of tissue slices sliced at multiple positions in the depth direction of a tissue excised from the biological region;
   a determination unit configured to determine an image as a standard and an image for comparison with the image as a standard from among a plurality of images acquired by the acquisition unit;
   an extraction unit configured to extract a plurality of feature points including a first feature point from the image as a standard, wherein each of the plurality of feature points is extracted from a respective portion without gradation present;
   a detection unit configured to detect a position corresponding to the feature point from the image for comparison;
   a mapping unit configured to map each pixel of the image for comparison to a corresponding position of a three-dimensional object while modifying the image for comparison to conform to the image as a standard; and
   a display unit configured to
      display the three-dimensional object as a thumbnail image, and
      display a three-dimensional slice image corresponding to a designated position of the three-dimensional object.

2. The biological image processing device according to claim 1, wherein the detection unit is configured to:
   set an attention block having a defined area in the image as a standard that is centered about the first feature point,
   search an area of the image for comparison for a corresponding comparison block that has the highest correlation value with the attention block, the search area of the image for comparison being larger than an area of the attention block,
   if the correlation value is equal to or larger than a defined value, set a center of the comparison block in the image for comparison as a corresponding position to the first feature point in the image as a standard, and
   if the correlation value is less than the defined value, delete the first feature point in the image as a standard.

3. The biological image processing device according to claim 1,
   the detection unit is configured to detect a plurality of respective corresponding positions from the image for comparison, and
   wherein the mapping unit is configured to modify the image for comparison by mapping each pixel of the image for comparison based on differences in position between respective feature points in the image as a standard and the corresponding positions in the image for comparison.

4. The biological image processing device according to claim 3, further comprising a dividing unit that is configured to:
   divide the image as a standard into a plurality of divided areas, each divided area being based on the plurality of the extracted feature points, and
   divide the image for comparison into a plurality of divided areas, each divided area being based on a plurality of the detected corresponding positions, the divided areas of the image as a standard corresponding to respective divided areas of the image for comparison.

5. The biological image processing device according to claim 4, wherein for at least one of the divided areas of the image for comparison, the mapping unit is configured to map each pixel of said divided area such that a shape of said divided area become more similar to a shape of the respective divided area of the image as a standard.

6. The biological image processing device according to claim 4, wherein shapes of the divided areas of the image as a standard and the image for comparison are triangular.

7. The biological image processing device according to claim 1, wherein the first feature point corresponds to a pixel position in the image as a standard where a change in luminance in a pixel area about said first feature point is equal to or smaller than a defined value.

8. The biological image processing device according to claim 1, wherein the first feature point corresponds to a pixel position in the image as a standard where a change in luminance in a pixel area about said first feature point is larger than a defined value.

9. The biological image processing device according to claim 1, further comprising:
   a display unit division unit that divides the image as a standard and the image for comparison into display unit blocks; and
   a display control unit,
   wherein the display control unit
   predicts a next image for display in accordance with a current image, stores the display unit blocks of the predicted image in a buffer memory,
   reads the display unit blocks of the same portions of the next image for display in a display area as the predicted image, from the buffer memory, and
   reads the display unit blocks of portions different from the predicted image from a storage unit.

10. The biological image processing device according to claim 1, further comprising:
   a three-dimensional image generation unit configured to store a plurality of images for comparison as a three-dimensional slice image.

11. The biological image processing device according to claim 10, further comprising:
a different resolution image generation unit configured to generate the three-dimensional slice image as an image of different resolutions for a plurality of levels, wherein each of the plurality of levels is divided into tiles.

12. A biological image processing method comprising:
acquiring, at multiple positions on an axis as a standard of a biological region, images of tissue slices sliced at multiple positions in the depth direction of a tissue excised from the biological region;
determining an image as a standard and an image for comparison with the image as a standard from among a plurality of images acquired by the acquisition unit;
extracting a plurality of feature points including a first feature point from the image as a standard, wherein each of the plurality of feature points is extracted from a respective portion without gradation present;
detecting a position corresponding to the feature point from the image for comparison;
mapping each pixel of the image for comparison to a corresponding position of a three-dimensional object while modifying the image for comparison to conform to the image as a standard;
displaying the three-dimensional object as a thumbnail image; and
displaying a three-dimensional slice image corresponding to a designated position of the three-dimensional object.

13. The biological image processing method according to claim 12, further comprising:
dividing the image as a standard and the image for comparison into display unit blocks;
predicting a next image for display in accordance with a current image, storing the display unit blocks of the predicted image in a buffer memory;
reading the display unit blocks of the same portions of the next image for display in a display area as the predicted image, from the buffer memory; and
reading the display unit blocks of portions different from the predicted image from a storage unit.

14. The biological image processing method according to claim 12, further comprising:
storing a plurality of images for comparison as a three-dimensional slice image.

15. A non-transitory computer readable storage medium storing a computer program for causing a computer to:
acquire, at multiple positions on an axis as a standard of a biological region, images of tissue slices sliced at multiple positions in the depth direction of a tissue excised from the biological region;
determine an image as a standard and an image for comparison with the image as a standard from among a plurality of images acquired by the acquisition unit;
extract a plurality of feature points including a first feature point from the image as a standard, wherein each of the plurality of feature points is extracted from a respective portion without gradation present;
detect a position corresponding to the feature point from the image for comparison;
map each pixel of the image for comparison to a corresponding position of a three-dimensional object while modifying the image for comparison to conform to the image as a standard;
display the three-dimensional object as a thumbnail image; and
display a three-dimensional slice image corresponding to a designated position of the three-dimensional object.

16. A non-transitory computer readable storage medium according to claim 15, further comprising causing the computer to:
divide the image as a standard and the image for comparison into display unit blocks;
predict a next image for display in accordance with a current image, storing the display unit blocks of the predicted image in a buffer memory;
read the display unit blocks of the same portions of the next image for display in a display area as the predicted image, from the buffer memory; and
read the display unit blocks of portions different from the predicted image from a storage unit.

17. A non-transitory computer readable storage medium according to claim 15, further comprising causing the computer to:
store a plurality of images for comparison as a three-dimensional slice image.

18. A biological image processing system comprising:
a microscope; and
a data processor,
wherein the data processor includes
an acquisition unit acquiring, at multiple positions on an axis as a standard of a biological region, images of tissue slices sliced at multiple positions in the depth direction of a tissue excised from the biological region,
a determination unit determining an image as a standard and an image for comparison with the image as a standard from among a plurality of images acquired by the acquisition unit,
an extraction unit configured to extract a plurality of feature points including a first feature point from the image as a standard, wherein each of the plurality of feature points is extracted from a respective portion without gradation present,
a detection unit configured to detect a position corresponding to the feature point from the image for comparison,
a mapping unit configured to map each pixel of the image for comparison to a corresponding position of a three-dimensional object while modifying the image for comparison to conform to the image as a standard, and
a display unit configured to
display the three-dimensional object as a thumbnail image, and
display a three-dimensional slice image corresponding to a designated position of the three-dimensional object.

19. The biological image processing system according to claim 18, further comprising:
a display unit division unit that divides the image as a standard and the image for comparison into display unit blocks; and
a display control unit,
wherein the display control unit
predicts a next image for display in accordance with a current image, stores the display unit blocks of the predicted image in a buffer memory,
reads the display unit blocks of the same portions of the next image for display in a display area as the predicted image, from the buffer memory, and
reads the display unit blocks of portions different from the predicted image from a storage unit.

20. The biological image processing system according to claim 18, further comprising:

a three-dimensional image generation unit configured to store a plurality of images for comparison as a three-dimensional slice image.

\* \* \* \* \*